Patented June 18, 1946

2,402,506

UNITED STATES PATENT OFFICE 2,402,506

RUBBERLIKE WAX SUBSTITUTED AROMATIC COMPOUNDS

Orland M. Reiff and John J. Giammaria, Woodbury, N. J., assignors to Socony-Vacuum Oil Company, Incorporated, New York, N. Y., a corporation of New York No Drawing. Application January 21, 1942, Serial No. 427,588

8 Claims. (Cl. 260—61)

This invention relates to a new composition of matter having plastic and rubber-like properties and is particularly concerned with products of that type derived by condensation of halogenated waxes of high halogen content with aromatic bodies and with the process for preparing the novel products.

The compositions of this invention are related to the mineral oil improving agents disclosed in U. S. Patent No. 2,191,498, issued February 27, 1940, to Orland M. Reiff. The agents of that prior patent are oil-soluble materials obtained by condensing a chlorinated wax, preferably containing about 14% chlorine, with an aromatic compound. It is there disclosed that compositions of this type tend to become harder and less soluble in hydrocarbon oils as the chlorine content of the chlorwax reactant is increased, until a chlorwax of 22% chlorine results in a rubbery reaction mass difficult to remove from the reaction vessel. As pointed out in the said patent, the reaction mass comprises aluminum phenate type derivatives of the condensation products. When these derivatives are converted to the phenol type by water washing, the mass is a viscous liquid.

As contrasted with the composition of that prior patent, the products of the present invention are rubber-like in nature, though differing in characteristic manner from natural rubber and most of the so-called "synthetic rubber" compositions now known to the art. Like rubber, the novel compositions are elastic, and this property is found to be more pronounced in the novel compositions of the invention than in natural rubber. The present compositions show a slower return to original form after deformation, but the return is substantially complete; whereas natural rubber returns rapidly to a form near that prior to deformation, after which it retains substantially the form of incomplete return. The present materials may be vulcanized and otherwise modified in substantially the same manner as rubber and may be blended with rubber to produce mixtures of differing properties.

It is also important to note that the present compositions may not be used for the same purposes as the compositions of Patent 2,191,498 because of their property of negligible solubility in mineral oils.

In general, the present compositions are highly alkylated aromatic compounds; i. e. containing aliphatic substituents of high molecular weight substituted at more than one carbon atom of each of the greater proportion of the aromatic nuclei.

The products of the invention are preferably prepared by reacting a highly chlorinated long-chain aliphatic compound or mixture of such compounds with an aromatic material in such proportions as to theoretically result in di- or tri-substitution of aromatics in the presence of a Friedel-Crafts type catalyst such as aluminum chloride.

The alkyl substituents are preferably derived from petroleum wax, a complex mixture of predominantly aliphatic hydrocarbons having more than 20 carbon atoms to the molecule, averaging about 24 carbon atoms, and the mixture having an average molecular weight in the neighborhood of 340. It has been reported that some petroleum waxes contain compounds having as few as 15 carbon atoms, but in general, the wax mixtures correspond to the above generalization, it being understood that the limit of 20 carbon atoms refers to the characterizing proportion of the mixture with only a small fraction of compounds having a smaller number of carbon atoms; in most cases, a fraction of one per cent.

The rubber-like characteristics of the wax-substituted compositions are apparently directly attributable to the wax substituents. When similar alkylated aromatic compounds are prepared from paraffins of lower molecular weight than the wax range as defined above, hard resins of some resiliency are formed but the flexible, rubber-like properties characterizing the products of the invention are lacking. Having aliphatic hydrocarbons of suitable characteristics, further control must be exercised in connection with the degree of alkylation. The proportion of reactants must be one which theoretically will polyalkylate the aromatic compound. The proportion of alkylating agent must be great enough that, if the alkyl groups were uniformly distributed among the aromatic molecules, each of those molecules would receive at least two long chain alkyl substituents as defined above. Preferably the aromatic is at least tri-substituted, since this degree of alkylation produces superior products.

The aromatic reactant used in forming the new compositions appears to be primarily a nucleus for reception of the wax groups imparting the desired properties to the finished material. Various substituted and unsubstituted aromatic compounds, single ring, polycyclic substances and compounds such as diphenyl and diphenyl methane are advantageously employed. It is, of course, essential that the aromatic body possess at least two unsubstituted carbon atoms in order that the desired substitution of long chain alkyl groups may be accomplished.

The aromatic compounds are not equivalent, however, with respect to the present invention as regards exact proportion of reactants and the degree of chlorination of the wax required to produce compositions of substantially the same properties. As a general rule, products derived from oxyaromatic compounds such as phenol, the naphthols and diphenyl ether are more resilient and elastic than those from unsubstituted aromatic hydrocarbons. Aromatics of the monocyclic type require reaction with chlorinated wax of higher chlorine content to form compositions having properties comparable to those of products formed from aromatics of the polycyclic and condensed nuclei types. It must be recognized, of course, that any given aromatic compound may be reacted with chlorinated wax in variable proportions and/or with wax having variable chlorine content (both within the limits defined) to form products varying in elasticity and tensile strength.

We have found that the chlorine content of the wax used in the alkylation reaction is an important factor. The chlorinated wax must have a chlorine content sufficiently high to produce tough compositions. Suitable properties for most purposes appear at a chlorine content of about 25% by weight, although higher degrees of chlorination are found preferable with some aromatic compounds, notably benzene, chlorinated waxes having as much as 50% chlorine content producing good compositions, although mechanical difficulties are encountered in their preparation by reason of the high viscosity of the mixtures so obtained.

The chemical nature of the molecules resulting from the present reactions is, as might be expected, widely varied and extremely complex. A rubber-like composition derived from phenol and 27% chlorwax (petroleum wax chlorinated to 27% chlorine content) in proportions to theoretically tri-alkylate the phenol contains about 25% phenol, with the remainder of the molecule consisting of combined wax radicals. The compositions of the invention may be represented by general formulae as set out below, it being understood that these merely represent probable linkages. It is not attempted to accurately depict molecules actually occurring in the complex compositions of the inventions, since these vary widely and very likely include in a single molecule several of the linkages indicated below. For simplicity, the aromatic nuclei are represented uniformly by the phenyl radical.

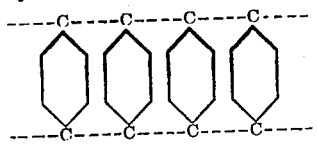

The compositions are represented in the foregoing formula with a single attachment of the aromatic group to each wax group, but in the reaction of chlorwax of high chlorine content with aromatic compounds as carried out in the preparation of the plastic and rubber-like compositions, apparently the aromatic group will be attached in some cases to more than one carbon of the same wax group, particularly in reactions with aromatic compounds of the condensed nuclei and polycyclic type.

Some chain formation would be expected to occur in the reaction of aromatic compounds with chlorinated waxes, in which case the following representation would be applicable, → representing a continuation of the chain structure.

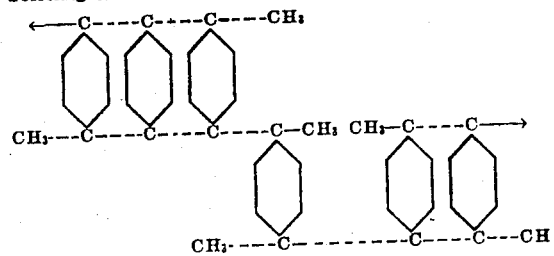

The rubber-like compositions are represented in the foregoing formulae as disubstituted aromatic compounds, but an amount of chlorwax can be reacted with the aromatic compounds sufficient to substitute all the replaceable hydrogens of the aromatic nucleus. Generally, an amount of chlorwax sufficient to at least trisubstitute the aromatic compound is favored. Chlorinated wax of 50% chlorine content can be prepared conveniently. This degree of chlorination of the wax can be used in formation of the rubber-like compositions, but will require the use of a powerful commercial mixer because of the high viscosity of the mixtures obtained. A tough, rubber-like product results from the preparation of wax phenol from 27% chlorwax and phenol in proportions for trisubstitution, which can be carried out in ordinary laboratory reactors of glass.

Example I

A superior product is obtained by reaction of 48 grams of phenol with 200 grams of chlorwax containing 27% chlorine by weight in the presence of 3 grams of anhydrous aluminum chloride.

Paraffin wax of A. S. T. M. melting point of about 126° F. and of average molecular weight of about 350, is melted and a current of chlorine introduced at a temperature of about 200° F. until the mass contains about 27% by weight of chlorine. The phenol is then introduced, followed by gradual addition of the anhydrous AlCl₃ at a temperature of about 150° F. with rapid stirring. The temperature of the mixture is gradually raised to about 350° F. during a two-hour period, with efficient stirring to reduce foaming caused by evolution of HCl gas. The reaction mixture is held at this temperature until the evolution of HCl is completed, which will require about one hour. The reaction mixture is then cooled and contacted with water to decompose the aluminum chloride reaction product, whereby the aluminum chloride can be removed from the mixture. To insure removal of any corrosive halogen, the product is then digested with dilute (1%) caustic soda by refluxing the mixture several hours, followed by removing the alkaline solution and neutralizing by water washing or neutralizing with dilute hydrochloric or acetic acid. During this purification, the product becomes coagulated and in this state can be formed into a sheet by running through squeeze rolls and further washed in this rolling operation. The rubber-like composition can be readily dried on a heated mill roll or can be cut into sheets and laid aside to dry.

The use of diluents, particularly hydrocarbon solvents such as Stoddard solvent, to reduce the viscosity of the reaction mixture in carrying out the Friedel-Crafts reaction, is to be avoided in the formation of rubber-like compositions from hydroxyaromatic compounds, as it has been found that the use of such diluents results in the formation of less rubber-like materials.

In the case of aromatic hydrocarbons and aromatic ethers, aliphatic hydrocarbon diluents are also undesirable, but chlorinated solvents such as ethylene dichloride and tetrachlorethane can be used to advantage. A diluent is necessary in the case of low boiling point aromatic hydrocarbons such as benzene in the formation of tough, plastic compositions. However, aromatic hydrocarbons and aromatic ethers in general have boiling points high enough that they can be reacted with chlorinated waxes by the same procedure outlined in the preparation of wax phenol. The purification procedure can also be carried out in the same manner as outlined for the wax phenol compositions.

Example II

The use of a diluent in carrying out the Friedel-Crafts reaction is illustrated in the following procedure.

| | |
|---|---|
| Benzene _____ grams__ | 78 |
| Chlorinated wax of 35% chlorine content _____ do____ | 300 |
| Ethylene dichloride _____ cc____ | 400 |
| AlCl₃ (anhydrous) _____ grams__ | 30 |

The benzene, chlorinated wax and ethylene dichloride are mixed together in a reaction vessel equipped with suitable stirrer, followed by addition of the aluminum chloride at room temperature. The reaction mixture is then heated to about 150° F. and held at this temperature until the evolution of HCl is completed, requiring a reaction period of about 6 hours. The purification of the product is carried out according to the procedure outlined above for wax phenol, the solvent being removed by steam treating the mixture during the water washing or caustic soda treat.

In the above examples, it will be noted that the chlorwax and aromatic compound are present in proportions to theoretically give tri-substitution. Although such proportions are preferred, valuable products result from reaction in proportions to give di-substitution as outlined in the following example:

Example III

| | Grams |
|---|---|
| Phenol _____ | 48 |
| Chlorinated wax of 27% chlorine content___ | 135 |
| AlCl₃ (anhydrous) _____ | 3 |

The reaction is conducted in substantially the same manner as that described in Example I. The product obtained possesses elastic properties to a substantial extent although materially less than the elastic properties of the composition obtained from the reaction mixture of Example I. It is also noteworthy that the product of di-substitution is somewhat more resinous in nature than is the tri-substituted phenol.

Without blending with compounding agents or heating with vulcanizing agents, the compositions are elastic when formed from a proportion of chlorwax sufficient to tri-substitute the aromatic compound, such as the wax phenol of Example I. With a lower degree of substitution, the products are less elastic and more resinous, an example of which is the wax phenol of Example III. As the chlorine content of the chlorwax is raised, the products become tougher but retain elastic properties if the proportion of phenol to wax is maintained. As the chlorine content is increased, it is therefore desirable to increase the amount of chlorwax used in the alkylation of the aromatic compound.

The compositions are not readily dissolved in the general line of organic solvents and the solubility becomes less as the degree of chlorination of the wax, from which the products are derived, is increased.

The compositions can be readily milled and compounded with fillers. Rubber is more readily plasticized in the milling operation when admixed with the novel compositions and in combination therewith gives a tough, homogeneous mixture.

Chemically, the wax aromatic compounds are susceptible to reactions which the parent aromatic compounds will undergo, but with formation of products having different physical characteristics. The resistance of the compounds to acids is high as would be expected since the products are formed in the presence of HCl. The compositions have excellent stability against deterioration upon exposure to air, whether in the dark or in the presence of light.

The plastic and rubber-like compositions give tough, adherent films as coating compositions and are particularly valuable for this purpose because of their resistance to cracking and resistance to corrosive acids. The more elastic materials are also valuable as plasticizing agents for brittle coating compositions.

The wax phenol products are desirable as moldable compositions or for incorporation with phenols of low molecular weight to be used in the formation of moldable compositions, with the purpose of plasticizing the materials.

When blended with compounding agents and heated with vulcanizing agents of the type effective with natural rubber, the elastic materials are adaptable to many uses as a substitute for vulcanized rubber.

Although the compositions have been described as formed by a Friedel-Crafts reaction, it will be apparent that other alkylation catalysts and procedures, as well known in the art, may be employed. At the present time, the Friedel-Crafts reaction appears to be most feasible commercially and is preferred. The proportions of aromatic material and halogenated wax may be expressed as ratio between mols of combined halogen in the halogenated wax and mols of the aromatic body or bodies employed.

A molecule of chlorine under normal conditions is diatomic and therefore the weight of a mol of the gas is based on twice the atomic weight. It does not follow that the term "mol" as applied to "combined" chlorine must also involve a concept of two chlorine atoms. For example, it is customary to speak of a molal solution of copper chloride as containing two mols of chlorine ion. The meaning of the words "mol ratio of combined chlorine to aromatic material" as used in the claims herein is based on a mol of combined chlorine consisting of a weight thereof corresponding to the atomic weight of chlorine and the molecular weight of the aromatic molecule rather than the molecular weight of both.

It will be seen that the invention is equally applicable to the use of pure aromatic compounds and mixtures of aromatics, with or without compounds other than aromatics. The term "aromatic material" is accordingly used in the claims to comprehend these aromatic compositions within the scope of the invention, it being understood that proportions recited relate only to the reactive aromatic compounds and do not include diluents, impurities and the like.

We claim:

1. A composition of matter having rubber-like properties formed by heating in the presence of a Friedel-Crafts catalyst a chlorinated petroleum wax containing at least 25% chlorine by weight and an oxy-aromatic material selected from the group consisting of phenol, the naphthols, and diphenyl ether; said reactants being present in a mol ratio of combined halogen to aromatic material not less than two; whereby the aromatic nuclei are caused to be polysubstituted at nuclear carbon atoms by alkyl groups and alkyl radicals are caused to be polysubstituted by aromatic nuclei thus forming a high molecular weight complex.

2. A composition of matter having rubber-like properties formed by heating in the presence of a Friedel-Crafts catalyst a chlorinated petroleum wax containing at least 25% chlorine by weight and an oxy-aromatic material selected from the group consisting of phenol, the naphthols, and diphenyl ether; said reactants being present in a mol ratio of combined halogen to aromatic material not less than three; whereby the aromatic nuclei are caused to be polysubstituted at nuclear carbon atoms by alkyl groups and alkyl radicals are caused to be polysubstituted by aromatic nuclei thus forming a high molecular weight complex.

3. A composition of matter having rubber-like properties formed by heating in the presence of anhydrous aluminum chloride a chlorinated petroleum wax containing at least 25% chlorine by weight and an oxy-aromatic material selected from the group consisting of phenol, the naphthols, and diphenyl ether; said reactants being present in a mol ratio of combined halogen to aromatic material not less than two; whereby the aromatic nuclei are caused to be polysubstituted at nuclear carbon atoms by alkyl groups and alkyl radicals are caused to be polysubstituted by aromatic nuclei thus forming a high molecular weight complex.

4. A composition of matter having rubber-like properties formed by heating in the presence of anhydrous aluminum chloride a chlorinated petroleum wax containing at least 25% chlorine by weight and an oxy-aromatic material selected from the group consisting of phenol, the naphthols and diphenyl ether; said reactants being present in a mol ratio of combined halogen to aromatic material not less than three; whereby the aromatic nuclei are caused to be polysubstituted at nuclear carbon atoms by alkyl groups and alkyl radicals are caused to be polysubstituted by aromatic nuclei thus forming a high molecular weight complex.

5. A composition of matter having rubber-like properties formed by heating in the presence of a Friedel-Crafts catalyst a chlorinated petroleum wax containing at least 25% chlorine by weight and phenol; said reactants being present in a mol ratio of combined halogen to phenol not less than two; whereby the aromatic nuclei are caused to be polysubstituted at nuclear carbon atoms by alkyl groups and alkyl radicals are caused to be polysubstituted by aromatic nuclei thus forming a high molecular weight complex.

6. A composition of matter having rubber-like properties formed by heating in the presence of a Friedel-Crafts catalyst a chlorinated petroleum wax containing at least 25% chlorine by weight and phenol; said reactants being present in a mol ratio of combined halogen to phenol not less than three; whereby the aromatic nuclei are caused to be polysubstituted at nuclear carbon atoms by alkyl groups and alkyl radicals are caused to be polysubstituted by aromatic nuclei thus forming a high molecular weight complex.

7. A composition of matter having rubber-like properties formed by heating in the presence of anhydrous aluminum chloride a chlorinated petroleum wax containing at least 25% chlorine by weight and phenol; said reactants being present in a mol ratio of combined halogen to phenol not less than two; whereby the aromatic nuclei are caused to be polysubstituted at nuclear carbon atoms by alkyl groups and alkyl radicals are caused to be polysubstituted by aromatic nuclei thus forming a high molecular weight complex.

8. A composition of matter having rubber-like properties formed by heating in the presence of anhydrous aluminum chloride a chlorinated petroleum wax containing at least 25% chlorine by weight and phenol; said reactants being present in a mol ratio of combined halogen to phenol not less than three; whereby the aromatic nuclei are caused to be polysubstituted at nuclear carbon atoms by alkyl groups and alkyl radicals are caused to be polysubstituted by aromatic nuclei thus forming a high molecular weight complex.

ORLAND M. REIFF.
JOHN J. GIAMMARIA.